May 31, 1927.  
B. C. SUTHERLAND  
FRUIT CLEANING AND POLISHING MACHINE  
Filed Nov. 15, 1926   3 Sheets-Sheet 2  
1,630,983
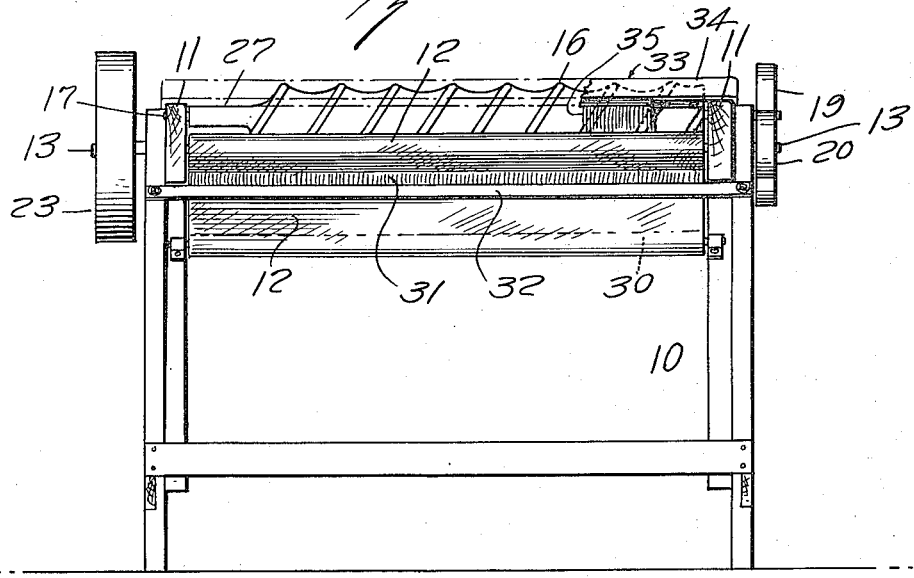
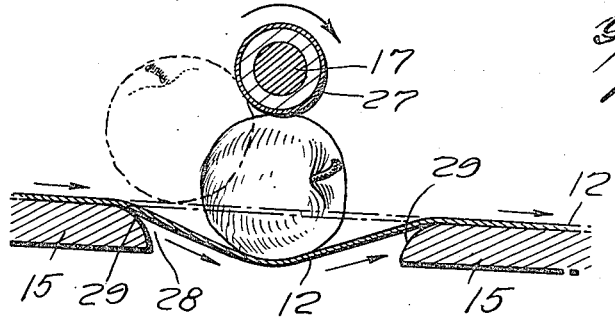
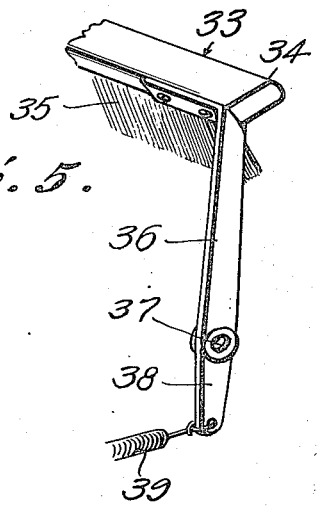
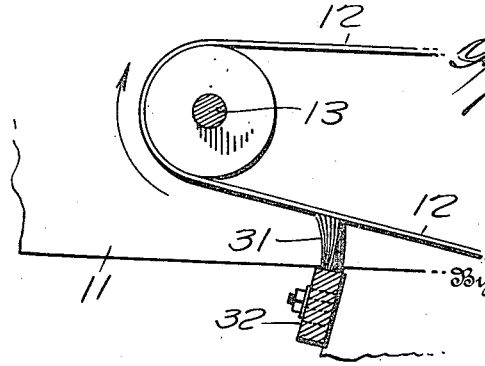
Inventor  
BOYD C. SUTHERLAND,  
By Chas. R. Allen  
Attorney May 31, 1927.
B. C. SUTHERLAND
FRUIT CLEANING AND POLISHING MACHINE
Filed Nov. 15, 1926   3 Sheets-Sheet 3
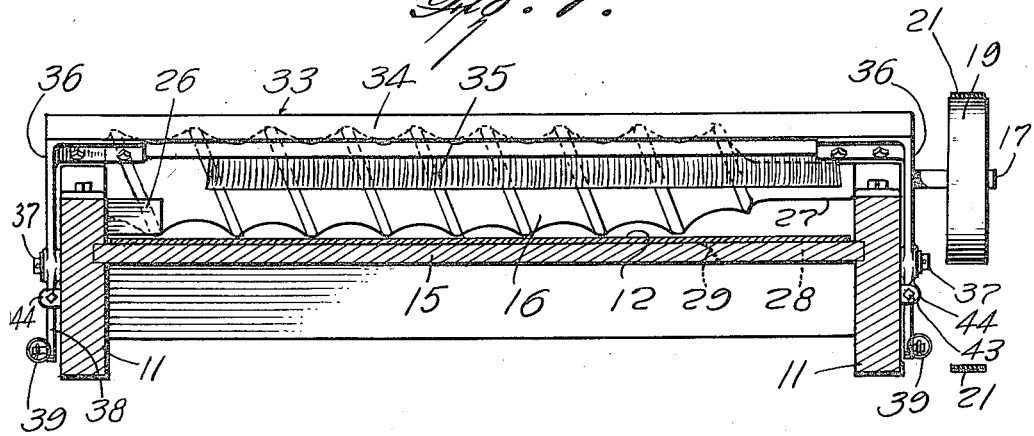
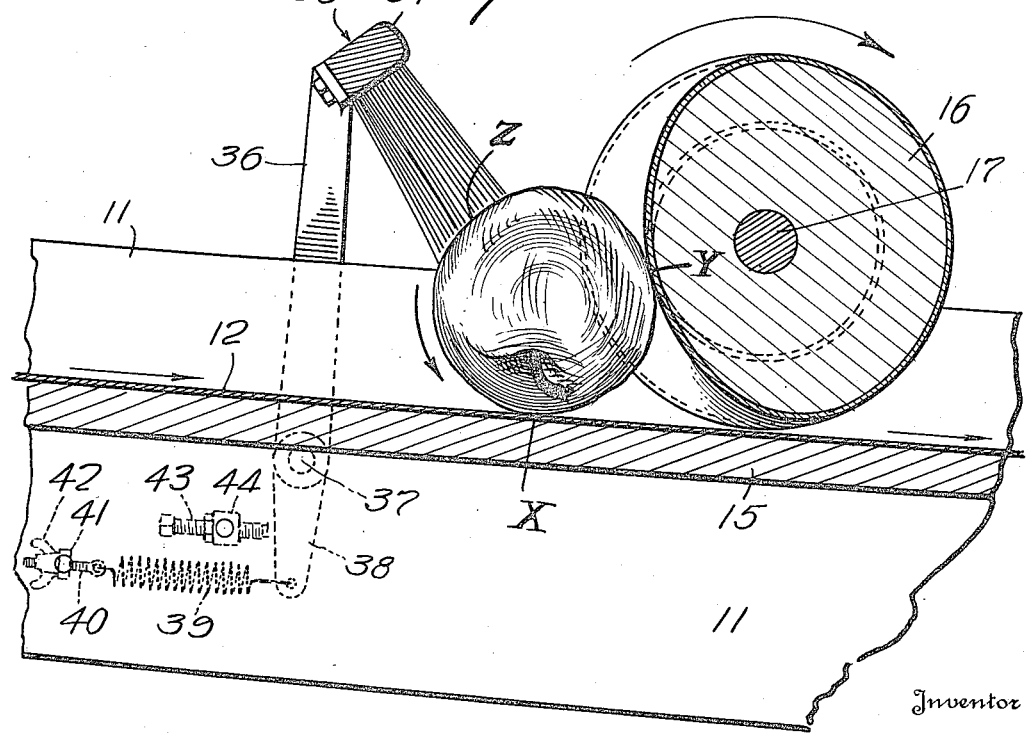
Inventor
BOYD C. SUTHERLAND,
By Chas R. Allen
Attorney Patented May 31, 1927.

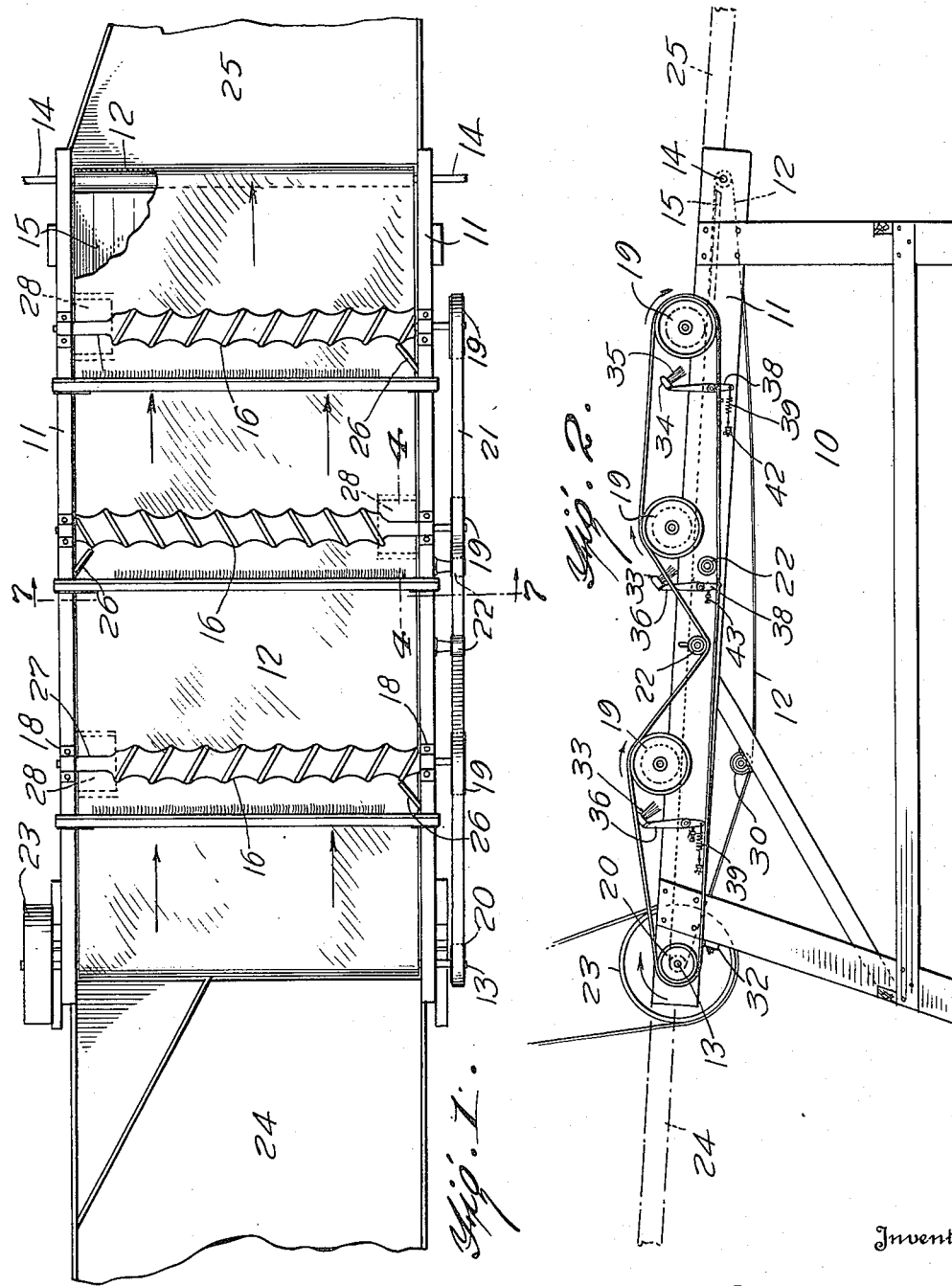

1,630,983

UNITED STATES PATENT OFFICE.

BOYD C. SUTHERLAND, OF NORTH GARDEN, VIRGINIA.

FRUIT CLEANING AND POLISHING MACHINE.

Application filed November 15, 1926. Serial No. 148,543.

My invention relates generally to fruit cleaning machines and particularly to a machine for wiping and polishing apples and has for an object to provide a device of simple construction which will effectually clean and polish the entire surface of the fruit as they are completely rolled back and forth over an endless conveyor together with mechanism for assuring contact between the various cleaning elements and which will automatically adjust itself to the various sizes of the fruit. The scope of my invention extends to whatever construction may be defined by or included within the terms or language of the appended claims.

In the drawings:

Figure 1 is a top plan view of my fruit cleaning and polishing machine;

Figure 2 is a side elevation thereof;

Figure 3 is an end elevation looking into the intake end of the machine;

Figure 4 is a somewhat diagrammatic detail sectional view taken on the line 4—4 of Figure 1;

Figure 5 is a view in perspective of one of the cleaning elements associated with my invention;

Figure 6 is a detail sectional view, parts broken away of the endless conveyor cleaning element;

Figure 7 is a transverse sectional view taken on the line 7—7 of Figure 1, looking in the direction of the arrows, and Figure 8 is an enlarged detail sectional view taken through one of the rollers illustrating the fruit in position.

My invention, in the form or embodiment shown in the drawings and briefly described, comprises a relatively stationary skeleton frame indicated generally at 10, having a pair of longitudinally extending side bars or members, 11 which may be braced in any desired manner. The spacing of the side bars, 11, of the frame, 10, of course, depend upon the desired output of the machine, between which is mounted an endless conveyor, 12, by means of the rollers or shafts, 13 and 14. To prevent the sagging of the endless conveyor, 12, which is, of course, located a suitable distance below the upper edge as to prevent the fruit from rolling off, I may provide a baseboard or platform, 15, as is illustrated in Figures 1, 2 and 4.

For the purpose of feeding the fruit in a crosswise direction to the direction of movement of the endless conveyor, I provide a plurality of transversely extending spiral rollers, 16, which are mounted between the side bars, 11, and whose lower edges are in close proximity to the endless conveyor, as is shown in dotted lines in Figure 2. These spiral rollers may be formed of wood or other suitable material and are covered with flannel or the like. In this manner, it will be readily seen that the fruit will not only be fed transversely across the movable endless cleaning cloth by the spiral rollers, but each roller itself will, due to its rounded face, wipe and polish the fruit.

The rollers are provided with a metallic shaft, 17, through their centers, so that they may be readily mounted with respect to the side members, 11, by means of the bearings or journal boxes, 18. Pulleys, 19, are keyed or otherwise fastened to one end of each shaft, 18, for the purpose of driving them simultaneously with the endless cleaning cloth, 12. This is probably best shown in Figure 2, wherein a pulley, 20, is shown as being mounted on the shaft, 13, for the purpose of driving the pulleys, 19, by means of the endless belt, 21. An adjustably mounted idler, 22, may be conveniently located upon the outer side of one of the side bars, 11, for taking up any lost motion of the endless belt, 21. On the opposite end of the shaft, 13, from that on which the pulley, 20, is located, I provide a drive pulley, 23, which may, of course, be driven from any suitable source. I have also found it very desirable in actual practice, to take the power for the fruit graders directly from the shaft, 14.

Suitable intake and outlet platforms or troughs, 24 and 25, are arranged adjacent each end of the machine as is clearly shown in Figure 1. For the purpose of preventing the fruit from jamming against the extreme corners between the side bars, 11, and the spiral rollers, 16, I provide guards or baffles, 26, which are preferably secured to the inner side of the bars, 11.

My novel means for permitting the fruit to pass from one roller to the next adjacent roller, so that the fruit will assume the back and forth or zigzag movements, consists of the forming of each of the rollers at one of their ends with a substantially reduced portion, 27, and the cutting away of a portion, as indicated at 28, of the floor board, 15, immediately below said reduced portion, 27. Referring now to Figure 4 of the accompanying drawings, each of the opposed edges, 29, of the cut-out portion, 28, is well rounded so as to permit the endless cleaning cloth to freely pass over it without undue friction or wear. The length of the reduced portion, 27, together with the cutaway portion, 28, is, of course, of sufficient size to assure the free passage of the maximum sized fruit to be cleaned and polished.

For readily varying the tension of the endless feeding cloth, 12, I may provide a yieldably or stationary mounted idler roller, 30, as shown in Figure 2.

The endless cloth, 12, feeds or causes the fruit to roll under the spiral rollers, 16, and due to the fact that the rollers are covered with cloth, and since the fruit is rolled upon the endless cloth conveyor, 12, as is clearly illustrated in Figures 4 and 8, the fruit will not be bruised or marred.

The dust or dried chemical which is usually deposited upon the fruit, of course, gathers upon the endless conveyor, 12, and usually falls from this conveyor as it travels face downwardly or when it travels idly beneath the bed of the machine.

Referring now particularly to Figure 6, it will be noted that I provide a tranversely extending cleaning brush, 31, for removing this spray residue at a point adjacent to the intake of the machine. The brush, 31, which extends the full width of the endless flannel carrier, 12, is suitably mounted in a transversely extending strip or bar, 32, which is, in turn, provided with suitable means for permitting vertical adjustment.

For the purpose of assuring the thorough cleaning of the fruit as it is rolled back and forth from one roller on to the next roller, I provide a pivotally mounted cleaning element, indicated generally as at 33, which is arranged adjacent to each one of the rollers, 16. Each of the cleaning elements, 33, comprises a transversely extending bar, 34, in which is mounted a brush, 35, and secured in the lower side of the bar, 34, in any desired manner. The brush, 35, preferably extends the entire distance of the spiral portion of its rollers, 16. The cleaning elements, 34, are provided on each of their ends with downwardly extending arms, 36, which are pivotally mounted to the outer frame bars, 11, as indicated at 37. The arms, 36, are extended downwardly below their pivotal points as shown at 38, and are provided with openings for the reception of one end of a coil spring, 39. The opposite end of the coil spring, 39, is attached to a threaded member, 40, which passes through an eye or bracket, 41, secured to the side bars, 11. Ring nuts, 42, are located upon the threaded members, 40, for varying the tension of the spring, 39. In order to provide a positive stop for the smallest size of fruit, I provide adjustable set screws, 43, and which are suitably mounted within relatively stationary lugs, 44, which are in turn also secured to the side bars, 11, and clearly shown in Figures 7 and 8.

These cleaning elements, it will be noted, not only more effectually wipe off and polish the fruit as they are forcibly moved across the path of the rollers, 16, and against the movable endless conveyor, 12, but it serves to yieldingly impinge or wedge the fruit between these relatively movable cleaning and polishing surfaces. I have indicated in Figure 8 of the accompanying drawings, by X, Y and Z, the several points of contact between the fruit and the endless conveyor, 12, the spiral roller, 16, and the yieldably mounted brush, 35, and it will be here noted that these several contacting points are substantially equidistantly spaced.

What I claim is:—

1. A fruit cleaning and polishing machine, comprising a frame, a cloth for supporting the fruit and a spiral roller mounted to rotate adjacent the cloth for feeding the fruit crosswise with respect to said cloth.

2. A fruit cleaning and polishing machine, comprising a frame, a cloth for supporting the fruit, a spiral roller mounted to rotate adjacent the cloth for feeding the fruit crosswise with respect to said cloth and means extending lengthwise of said spiral roller and bearing against the fruit for assuring effective contact between the fruit and said cloth.

3. A fruit cleaning and polishing machine, comprising a frame, an endless cleaning cloth, rollers for holding the cloth substantially taut, and a spiral roller mounted to rotate adjacent the cloth for feeding the fruit crosswise with respect to said cloth.

4. A fruit cleaning and polishing machine, comprising a frame, an endless cleaning cloth, rollers for holding the cloth substantially taut, a spiral roller mounted to rotate adjacent the cloth for feeding the fruit crosswise with respect to said cloth and means extending lengthwise of said spiral roller for assuring the contact between the fruit and said cloth.

5. A fruit cleaning and polishing machine, comprising a frame, a cloth for supporting the fruit, a spiral roller mounted to rotate adjacent the cloth for feeding the fruit crosswise with respect to said cloth and a resiliently mounted brush arranged parallel with respect to the spiral roller for assuring effective contact of the fruit between said roller and cloth.

6. A fruit cleaning and polishing machine, comprising a frame, a cloth for supporting the fruit and a plurality of spiral rollers arranged in parallel relation and mounted to rotate adjacent the cloth for feeding the fruit crosswise with respect to said cloth.

7. A fruit cleaning and polishing machine, comprising a frame, a cloth for supporting the fruit, a plurality of spiral rollers arranged in parallel relation and mounted to rotate adjacent the cloth for feeding the fruit crosswise with respect to said cloth and a movably mounted brush arranged adjacent to each of said spiral rollers.

8. A fruit cleaning and polishing machine, comprising a frame, a cloth for supporting the fruit, a plurality of spiral rollers arranged in parallel relation and mounted to rotate adjacent the cloth for feeding the fruit crosswise with respect to said cloth, a movably mounted brush arranged adjacent to each of said spiral rollers and resilient means connected to said brush for assuring a positive contact between the fruit and said cloth.

9. A fruit cleaning and polishing machine, comprising a frame, an endless cleaning cloth, rollers for holding the cloth substantially taut, and a plurality of spiral rollers arranged in parallel relation and mounted to rotate adjacent the cloth for feeding the fruit crosswise with respect to said cloth.

10. A fruit cleaning and polishing machine, comprising a frame, a cloth for supporting the fruit and a spiral roller mounted to rotate adjacent the cloth for feeding the fruit crosswise with respect to said cloth, and said cloth being yieldably associated with one end of the roller for permitting the fruit to pass under said roller.

11. A fruit cleaning and polishing machine, comprising a frame, an endless cleaning cloth, rollers for holding the cloth substantially taut, and a plurality of spiral rollers arranged in parallel relation and mounted to rotate adjacent the cloth for feeding the fruit crosswise with respect to said cloth, and means associated with one end of the rollers for permitting the fruit to pass under said rollers.

12. A fruit cleaning and polishing machine, comprising a frame, a cloth movably mounted upon said frame for supporting the fruit, a spiral roller having a reduced portion at one end thereof and mounted to rotate on the upper portion of the movably mounted cloth for feeding the fruit transversely with respect to the movement of said cloth, and said cloth being yieldable adjacent the reduced portion of said roller for permitting the fruit to pass under the roller in the direction of the movement of said cloth.

13. A fruit cleaning and polishing machine, comprising a frame, a cloth movably mounted upon said frame for supporting the fruit, a spiral roller having a reduced portion at one end thereof and mounted to rotate on the upper portion of the movably mounted cloth for feeding the fruit transversely with respect to the movement of said cloth, said cloth being yieldable adjacent the reduced portion of said roller for permitting the fruit to pass under the roller in the direction of the movement of said cloth and means extending lengthwise of said spiral roller for assuring the contact between the fruit and said cloth.

14. A fruit cleaning and polishing machine, comprising a frame, a platform mounted with respect to the frame, and having a plurality of openings, a movably mounted endless cloth resting upon the platform, and a plurality of spiral rollers having reduced portions located adjacent said openings in the platform, permitting a passageway for the fruit to pass under said roller.

15. A fruit cleaning and polishing machine, comprising a frame, a platform mounted with respect to the frame, and having a plurality of openings, a movably mounted endless cloth resting upon the platform, a plurality of spiral rollers having reduced portions located adjacent said openings in the platform, permitting a passageway for the fruit to pass under said roller and a resiliently mounted brush arranged parallel with respect to the spiral roller for bearing against the fruit and impinging it between said roller and cloth.

BOYD C. SUTHERLAND.